United States Patent [19]

Mongiello, Sr.

[11] Patent Number: 4,608,921
[45] Date of Patent: Sep. 2, 1986

[54] CHEESE MANUFACTURING METHOD AND APPARATUS

[76] Inventor: Angelo Mongiello, Sr., 1655-84th St., Brooklyn, N.Y. 11214

[21] Appl. No.: 649,548

[22] Filed: Sep. 11, 1984

[51] Int. Cl.⁴ .................... A01J 25/00; A23C 19/00
[52] U.S. Cl. ........................................ 99/455; 99/453
[58] Field of Search ................................ 99/452–455, 99/456, 459, 457, 460, 465, 483; 426/582, 583; 425/80.1

[56] References Cited

U.S. PATENT DOCUMENTS

| | | | |
|---|---|---|---|
| 4,112,835 | 9/1978 | Mongiello | 99/455 |
| 4,453,867 | 6/1984 | Sharps | 366/147 X |

*Primary Examiner*—Timothy F. Simone
*Attorney, Agent, or Firm*—Handal & Morofsky

[57] ABSTRACT

A cheese molding machine (10) is described in which molds (104) in individual compartments (94) on a molding table (80) are flooded individually.

The cheese is brought into contact with heat sinks (112) which created additional surfaces (208) for salting and cooling, resulting in drastically reduced brining and curing times.

34 Claims, 25 Drawing Figures

CHEESE MANUFACTURING METHOD AND APPARATUS

TECHNICAL FIELD

The invention relates to cheese manufacturing and is particularly applicable to the manufacture of pasta filata cheese, also commonly known as mozzarella.

BACKGROUND ART

Traditionally, pasta filata cheese is manufactured by a laborious process of hand working, including, using a culture to make cheese curd, kneading the curd in extremely hot water, being careful not to overknead, thus resulting in less loss of fat from the cheese, molding the cheese and cooling and brining of the hand made cheese. Naturally enough, this process is extremely time consuming and, from a practical standpoint, is not easily applicable to the manufacture of cheese in large commercial quantities.

Nevertheless, this process of manufacturing remained relatively unchanged until very recently. One major step in the development of processes for the commercial manufacture of pasta filata or mozzarella cheese was introduced by me in the 1970's and is described in my U.S. Pat. No. 4,112,835 directed to a cheese processing system. In this patent I describe, among other things, a machine for molding and cooling the cooked and kneaded cheese curd. In accordance with this process, a plurality of molds are disposed on a rotating table which also supports a cooling tank within which the cheese molds are contained. In this machine, which is, today, substantially the only practical and widely employed mozzarella molding machine available on the market, as the table is rotated, cheese is fed from the under side of the table into the molds. At the same time, the molds are subjected to a bath of circulating coolant, such as glycol brine or chilled water. As the table rotates different molds are filled with cheese and after completing the rotary cycle, the contents of the mold are ejected and sent down the manufacturing line to a downstream manufacturing process steps. Such downstream processing steps include salting in brine for a period of time packing and curing the completed packed cheese during which time the salt in the rind, formed during the salting process, salt migrates toward the center of the cheese to give it the desired consistency, meltability and flavor.

In order to more fully understand the subject matter of the invention, it is valuable to note that the manufacture of mozzarella cheese falls, generally, into two catagories. The first catagory is the manufacture of large (greater than two kilogram cheeses). In accordance with the presently employed commercial methods for the manufacture of such big cheeses, the cooked and kneaded cheese curd is fed into the metal molds in an apparatus such as that illustrated in FIG. 2 in my earlier patent. After being fed into the mold, the molded cheese rotates on the table in the cooling bath until it is ejected from the machine. Because the cheese is large, cooling is relatively ineffective and it is necessary to put the ejected cheese, which has been metered accurately in terms of weight, into a forming tray made of plastic or stainless steel. Once the forming tray has been filled with a single cheese, the forming tray is then put in a bath of cold water for about one half to one and one half hours to cool it from its very high core temperature. After an hour or so, the core of the cheese has had its temperature lowered from 55° C. to the range of 5°–35° C. At this point, the cheese is sufficiently cooled that it will maintain its shape and may be then placed in a brine tank for further cooling and salting. The cheese is kept in the brine tank for approximately twenty-four hours, during which time it develops a salty rind. The cheese is then removed from the brine and packaged. However, the cheese is not suitable for use at this time because the salt is concentrated in the outer layers of the cheese. There is thus substantially no salt at the core of the cheese. It is necessary for reasons of meltability, flavor, avoidance of burning and preservation that the salt permeate through to the core of the cheese. Accordingly, it is necessary to cure the packaged big cheese in a refrigerated warehouse or box for about 1,000 hours, during which time the salt in the rind permeates through to the center of the cheese. After the 1,000 hour curing process, the cheese may then be used with best results.

Figure 4:
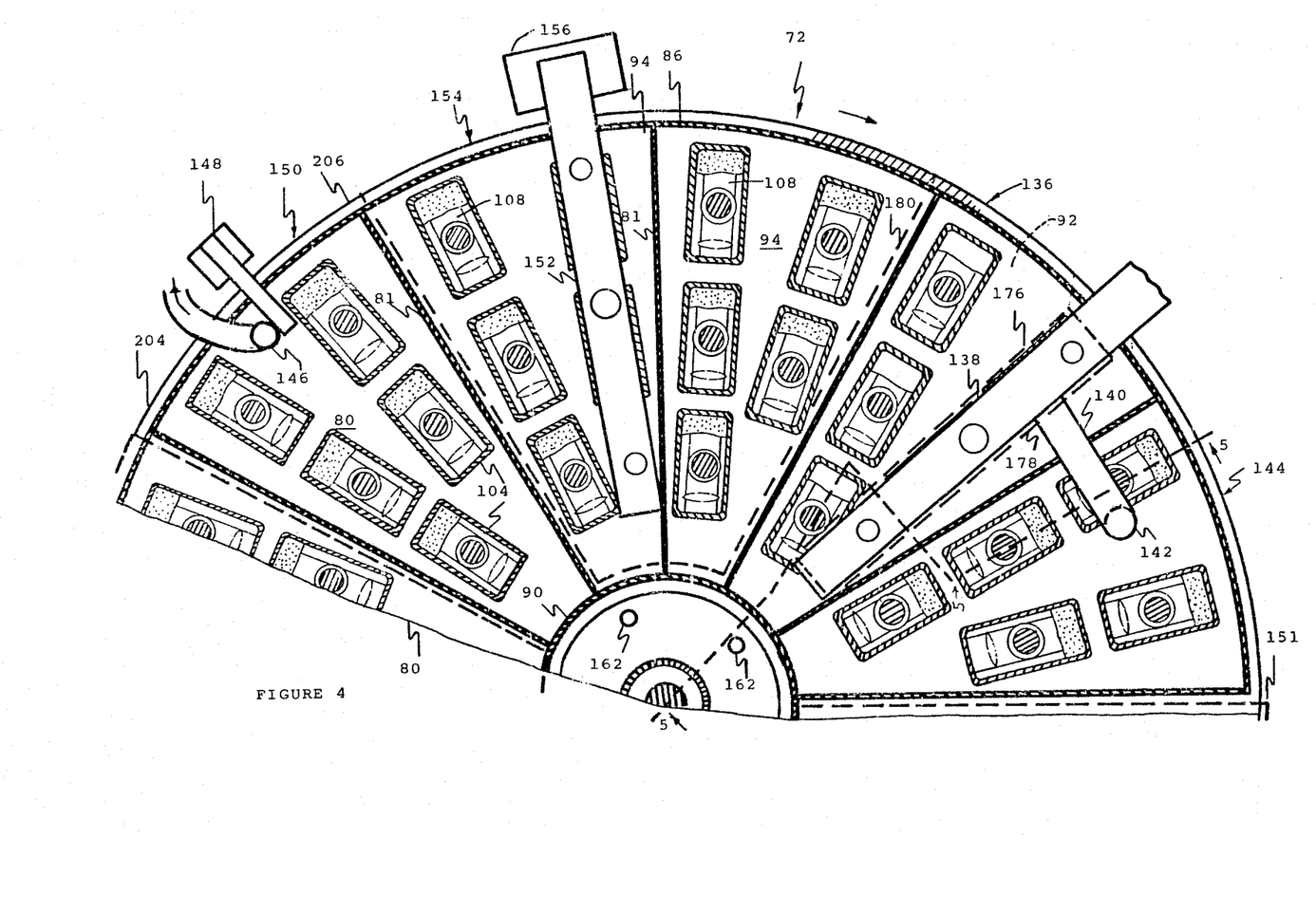

In the case of the smaller cheeses, such as those having a weight on the order of 0.25 to 0.5 kilograms, a similar process is employed, but, because the smaller size of the cheese and the consequent ability to be cooled more quickly and thus hold its shape, slightly different steps are used. In particular, such small cheeses are molded in a machine such as that illustrated in FIG. 2 of my earlier patent. However the machine is modified to the extent that a sizing sleeve is added to the mold's plunger as illustrated in FIG. 4 of my patent. After molding, the cheese in the molds is rotated on the table all the time being cooled by the bath surrounding the molds. After completing the rotating cooling cycle in the machine, the cheese is then ejected from the machine and is further cooled and salted in brine for about 1–2 hours. Because the cheese is smaller, the cheese cools to a much greater extent in the molding machine and, accordingly, holds its shape upon ejection from the machine into the brine and thus need not be put into a forming tray. After being salted in the brine for 1–2 hours, the small cheese is packed and is allowed to cure overnight, allowing salt to penetrate to the center of the cheese before use by the consumer.

While the machinery which I described in my earlier patent is a great advance over the methods previously employed in the art, there still are, and the industry has for many years now, tolerated a number of significant problems, including, in the case of big cheeses the necessity for molding trays, long salting times and long curing times. It is obvious that the use of trays for molding the cheese shape is a manual operation involving the loading, handling and cleaning of trays and the moving of the cheese manually from one step to another. The salting of cheese for a period of twenty-four hours is another time consuming step which reduces the number of pounds of cheese per hour that can be manufactured as well as resulting in a great number of trays being needed. Likewise, curing the cheese for a period of twelve to fourteen days, as is commonly done in the industry today, involves a phenomenal expense in view of the fact that the cheese being cured must be refrigerated and takes up a great deal of expensive floor plant space. In the case of the small cheese, all the problems described above exist, but to a lesser degree owing to the smaller size of the cheese. Nonethelss, there are significant limitations on the production rate at which cheese may be manufactured.

gages a sprocket chain extending annularly about the circumference of the base of molding assembly 72. Inasmuch as the rotation of the assembly 72 is intermittent, as well as variable, the junction box 74 is desirably put in easily accessible positions supported by vertical member 76 whereby the operator is able to access it during operation of the inventive system. Junction box 74 and its associated switching mechanisms and control switches are all connected by means of electrical wiring 78. Such control circuitry may be of conventional design, such as relay, transistor or microprocessor control circuitry and forms no part of the invention.

Molding assembly 72 is supported on horizontal shelf 38. A more detailed understanding of assembly 72 may be had with reference to FIG. 2. In particular, assembly 72 comprises a lower support plate 80 which is divided into areas subtended by arcs of 30° by partition walls 81. Lower plate 80 is formed with inner circumferential grooves 82, outer circumferential grooves 83 and radially extending grooves 84. Outer annular wall 86 is disposed in outer circumferential groove 83. Inner circumferential wall 90 is disposed in inner circumferential groove 82 while the compartments are formed by partition walls 81 which, being securely disposed in grooves 84 form individual water-tight compartments. The formation of water-tight compartments is assured due to the fact that vertical outer annular wall 86, inner annular wall 90 and partition walls 81 are all welded to each other and into their respective support grooves. Alternatively, the grooves and welding may be dispensed with and support and sealing performed by other means, such as brackets and silicone sealant. In this case, one arm of the bracket can be tack welded to the wall 81 and the other screwed to the plate 80.

Figure 2:
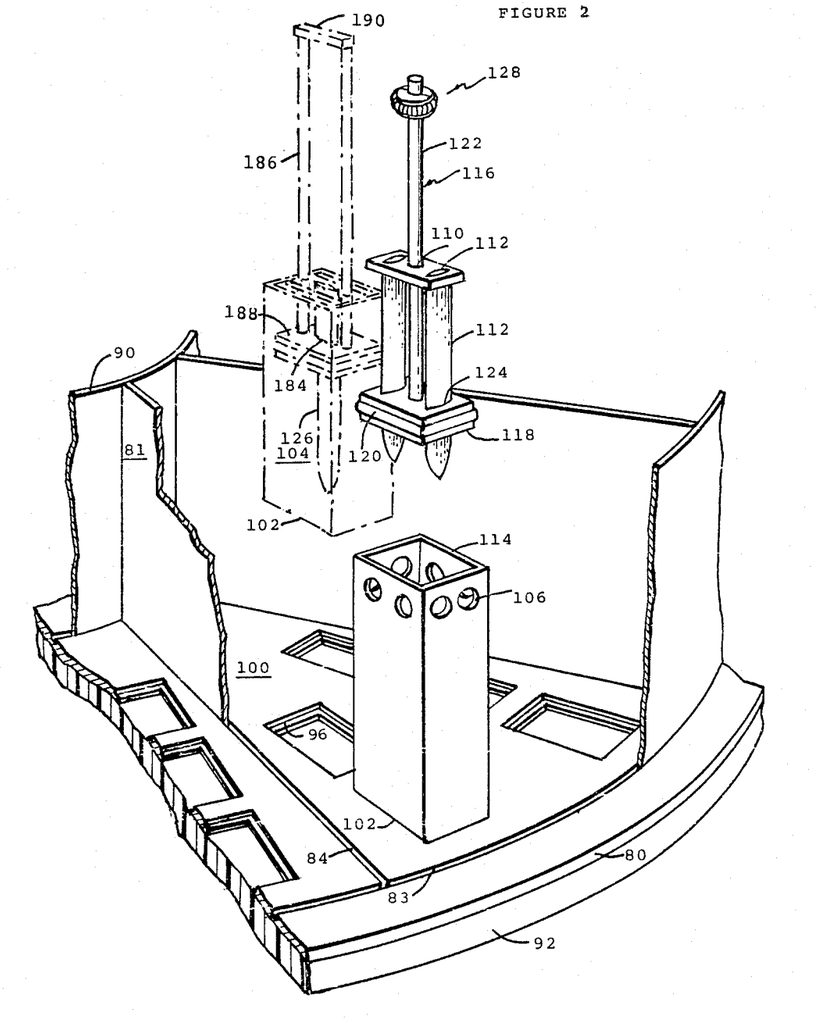

A severing plate 92 immediately underlies lower-supporting plate 80. Severing plate 92 is disposed in a horizontal frame and is in contact with the bottom surface of plate 80. Severing plate 92 is maintained in a stationary position with respect to the frame 28. In contrast, lower supporting plate 80 attached to drive shaft 42 is free to rotate on severing plate 92.

As discussed above, plate 80 and the inner and outer circumferential walls, together with the radial walls, form a plurality of compartments 94 which each subtend an arc of 30°. Thus, twelve radial compartments are disposed about the circumference of plate 80. The combination of circumferential and radial elements result in the provision of a structure with good structural integrity.

As can be seen most clearly in FIG. 2, lower supporting plate 80 includes a plurality of orifices 96. The circumferential portions of orifices 96 are provided with grooves 98 or counter bores which are milled therein and extend down from the top 100 of the supporting plate 80. Grooves 98 provide an engagement surface for the bottom edge 102 of molds 104. Molds 104 are provided with a plurality of coolant entry ports 106. Likewise, the top of the molds is provided with a thin support plate 108 which inlcudes a plunger support hole 110. A pair of fins 112 are disposed within mold 104 and supported therein by fin support plate 108. It is noted that fin supported plate 108 is rigidly secured by welding or screws to the top 114 of molds 104.

Disposed within each of the molds 104 is a plunger assembly 116 which comprises a plunger plate 118, a sealing gromet 120 and a plunger rod 122. Plunger plate 118 also includes a pair of blade receiving holes 124. In the assembled machine, the plunger assembly is disposed within the mold body. This can be seen somewhat more clearly in the case of the alternative plunger embodiment illustrated in phantom lines in FIG. 2 which alternative involves a pair of plunger rods and a single fin as is generally indicated by reference numeral 126. Plunger rod 122 is provided with a stop assembly 128 which prevents it from sliding out from the bottom of the mold. Stop assembly 128 is illustrated more clearly in FIG. 3 which contains an illustration of yet another alternative mold configuration which will be described in detail below. In particular, stop assembly 128 comprises a pair of split rings 130 and an elastic member 132 which maintains them in secure engagement with engagement groove 134. Elastic member 132 may be any suitable member such as a spring or rubber elastic ring. While any suitable means of attachment may be used to join the plunger rod 122 to the plunger plate 118, in accordance with the preferred embodiment, plunger 118 is provided with a tapped hole and the end of rod 122 is threaded in order to be put into secure engagement therewith.

Figure 3:
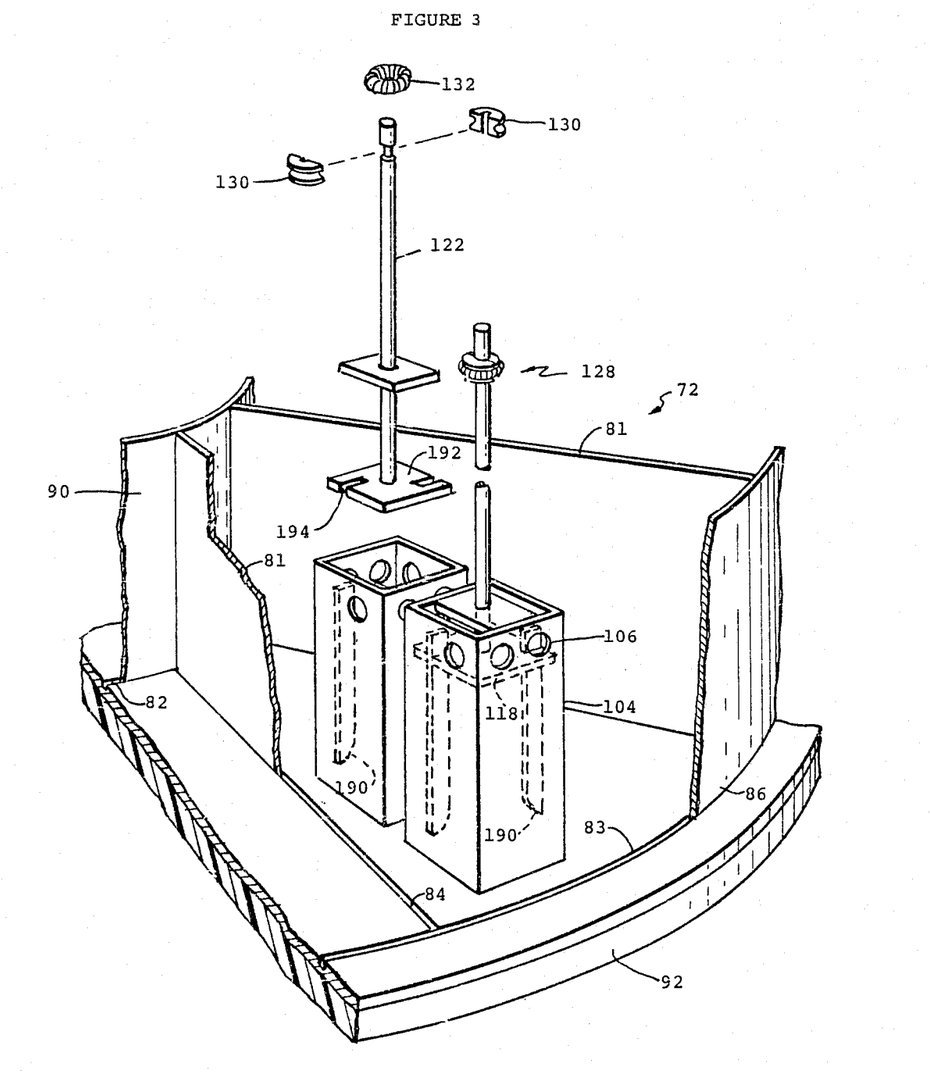

Turning to FIG. 3, the arrangement of molds on supporting plate 80 is illustrated. In particular, each compartment 94 contains five molds 104.

Figure 1:
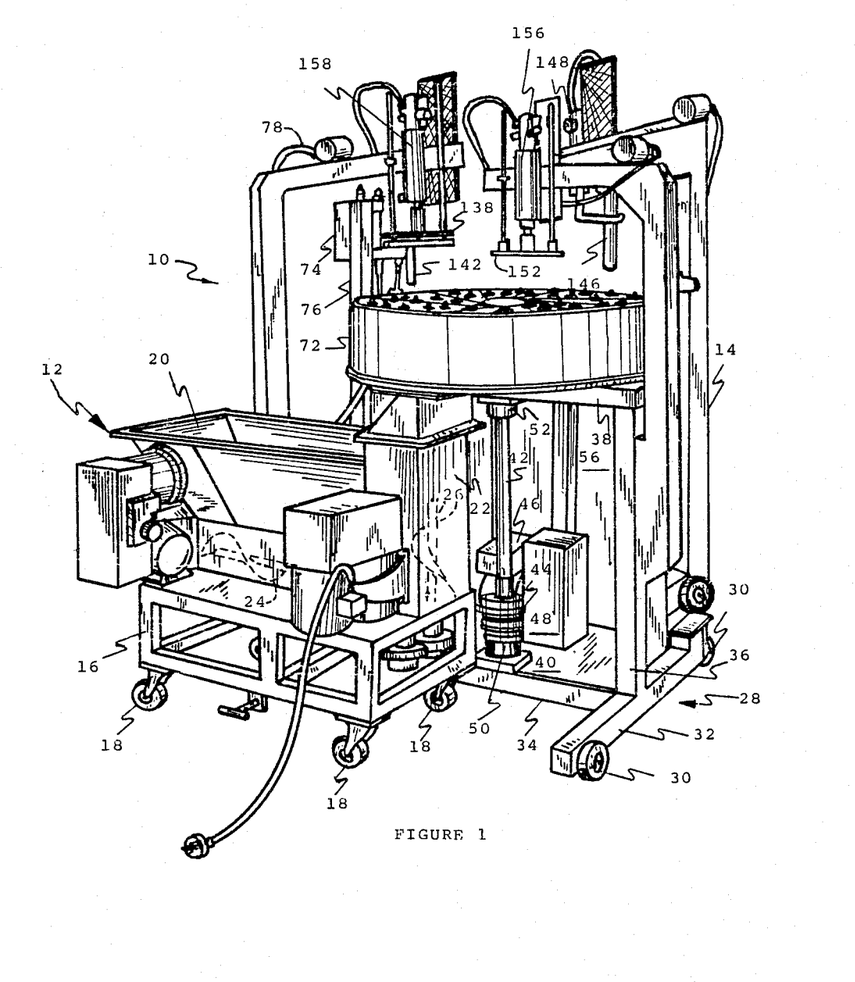
Figure 5:
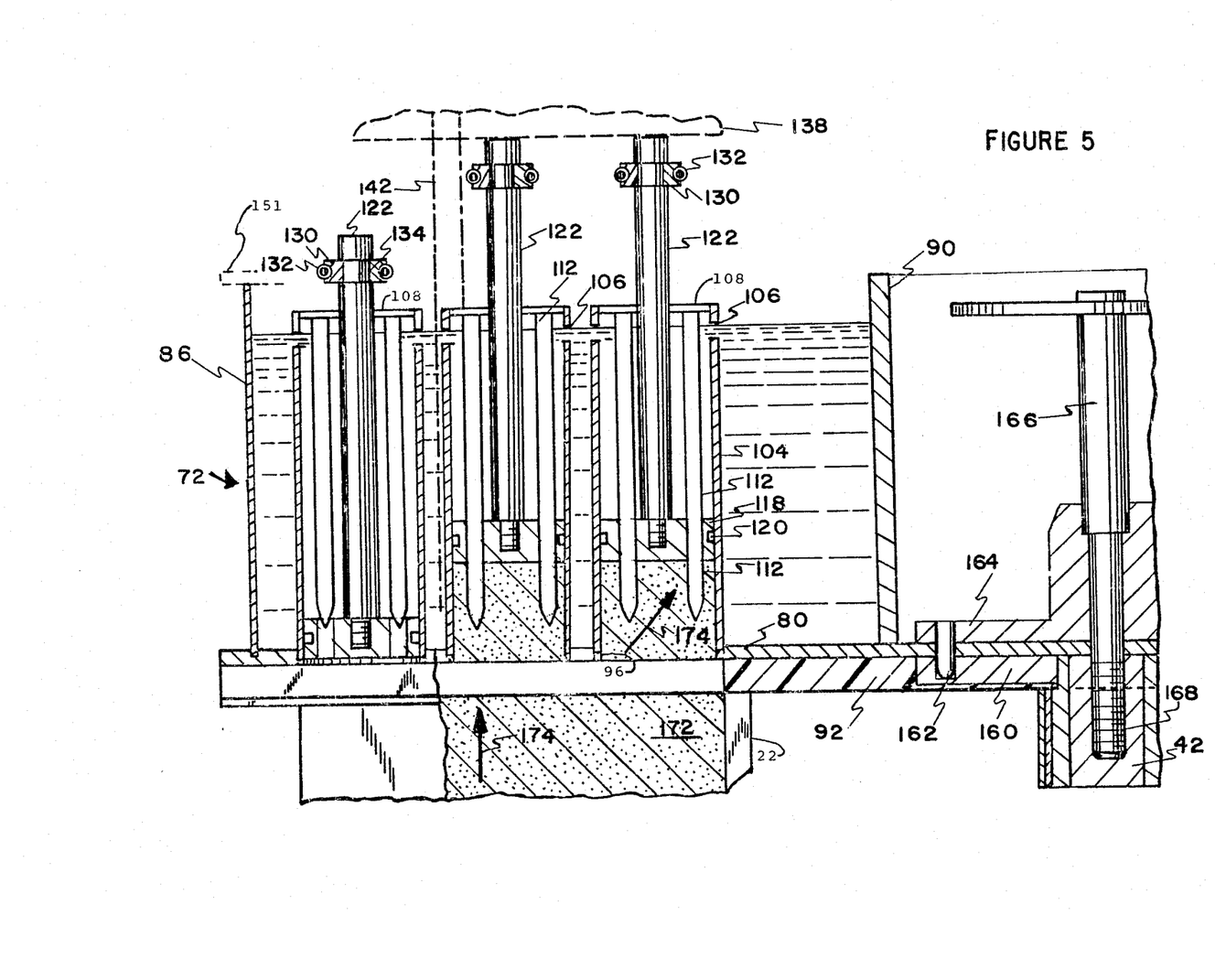
Figure 6:
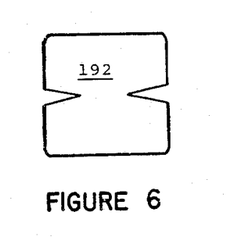
Figure 7:
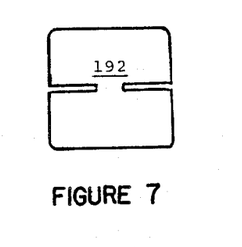
Figure 8:
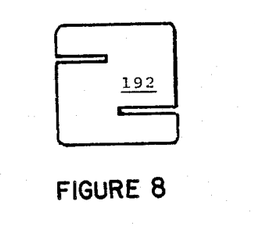
Figure 9:
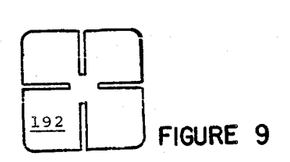
Figure 10:
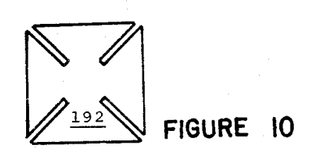
Figure 11:
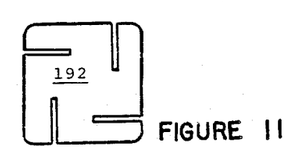
Figure 12:
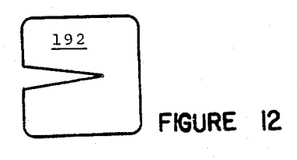
Figure 13:
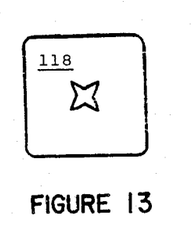
Figure 14:
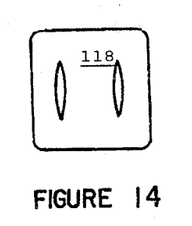
Figure 15:
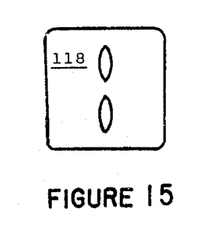

Turning to FIG. 4, the operation of the inventive system is schematically illustrated. In particular, it is noted that the system includes a fill position indicated generally by reference numeral 136. At the fill position, a pneumatically operated limit bar 138 is located. Bar 138 is also seen in FIG. 1. An understanding of the fill operation may be seen more clearly with reference to FIG. 5. During the fill operation, bar 138 is brought down to the position illustrated in phantom lines in FIG. 5. Cheese enters through orifices 96 and the filling operation is limited by limit bar 138. Limit bar 138 is pneumaticallyactuated in synchronism with the position of plate 80. Attached to limit bar 138 is transverse support 140 which, in turn, is attached to flooding tube 142 as can be seen in FIGS. 4 and 5. Because transverse support 140 is secured to limit bar 138 as limit bar 138 is moved up and down in response to actuation of the air cylinder, the tube 142 is advanced into the compartment located at the flood position generally indicated by reference numeral 144.

Continuing in the clockwise direction, a flush tube 146 is schematically illustrated in FIG. 4. Flush tube 146 is also moved up and down by a pneumatic operator indicatd schematically at 148. Flush tube 146 is connected to a pump and when it is lowered into the compartment located at flush position 150 removes liquid contained in the compartment. A cover 151 may be provided on top of the molding assembly 72, to cover the compartments 94. Finally, an ejection plate 152 is located at the ejection position 154 and is also operated by a pneumatic cylinder 156 to be advanced in the downward direction to push extending plunger rods 122 into the molds 104 thereby ejecting cooled molded cheese. Cylinders 148, 156 and the cylinder 158 which limits the filling operation are all electrically controlled in response to the position of the molding assembly 72. As can be seen in FIG. 5, shaft 42 is coupled to rotary drive plate 160. Plate 160 is coupled to lower supporting plate 80 by a plurality of pins 162. Plate 80 is rigidly secured to the drive system by upper securing plate 164 which, in turn, is engaged with shaft 42 by bolt 166 which screws into a tapped hole in shaft 42 via its threads 168.

During operation of the inventive system, cooked curd is placed into hopper 20 and advanced by auger 24 toward auger 26. Auger 26 then feeds curd 172 in the directions indicated by arrows 174 in FIG. 5. During the filling operation, plunger plates 118 are advanced to the positions shown in FIG. 5, although it is noted that FIG. 5 is meant to illustrate the position of the mechanism after filling has been completed and the thus filled molds have been advanced to the next position. It is noted that during filling, limit bar 138 limits the extent to which the plungers may rise thus limiting the volume of cheese 172 within molds 104. It is noted that during the cheese feeding operation, the cheese passes through an orifice 176 in severing plate 92. After the filling operation has been completed, the lower supporting plate 80 is advanced 30° to the position illustrated in FIG. 5.

During this advancement of the supporting plate, the cheese curd 172 which has entered molds 104 is severed by the peripheral edge of 178 of the orifice 176 of severing plate 92. It is noted that the cheese has a pair of fins 112 disposed in it. After the molds have been fed with curd and before movement of the lower supporting plate, the air cylinder 158 which pushed the limit bar 138 to the position illustrated in FIG. 5 in phantom lines, retracts the limit bar and thereby retracts tube 142 from the adjacent compartment to a position above the chambers 94. Thus, the lower supporting plate is free to rotate to 30° as described above.

Once rotation by 30° has occurred, limit bar 138 is then advanced to the position shown in phantom lines in FIG. 5 once again thus lowering tube 142 into the compartment which has just had its molds filled with cheese. The compartment is then flooded with brine at −12° C. through tube 142.

It is noted that the brine can be made much colder than my prior art machine inasmuch as the liquid only comes into contact with already molded cheese. It does not come into contact with unfilled molds, and making them too cold. Because these unfilled molds are at a warmer temperature, when the cheese is fed into them, it forms a smooth surface which is desirable from a commercial standpoint. After the flooding operation has been completed, the tube attached to limit bar 138 is again raised.

It is noted that while each incremental movement of the lower supporting plate is 15°, corresponding to movement from one set of three molds to a set of two molds and so forth, it is only necessary to flood the compartment every other 15° movement inasmuch as there are two sets of molds in each compartment which are flooded simultaneously. As the above operation continues, the cheese cools until it reaches the flush position indicated at reference numeral 150. Here an air cylinder, in response to 30° movements, of the lower supporting plate 80, is plunged into the compartment located at the flush position and a pump removes the coolant therefrom. The compartment then proceeds to the eject position generally indicated at reference numeral 154 where an ejection plate, also operated by an air cylinder, is advanced downwardly against the plunger rods 122 causing them to force the formed cheese through the ejection cutaway 180 on the severing plate 92.

The formed cheese is then ejected into a brine solution. It is noted that because of the efficiency of the cooling operation, which is caused due to the fact that the brine is very cold, brine is allowed to enter above the molds through orifices 106. The brine's cold temperature is conducted by fins or blades 112 into the heart of the cheese, making the cheese very cold and able to hold its shape. Thus, when it rests in the brine, the cheese is salted very quickly. Since we have twice the surface area and a lower cheese temperature (heat in cheese keeps the salt out). The salted cheese is then compressed into plastic bags removing the extra surface area, and packaged.

Turning in particular to the processing of smaller consumer size cheeses, in the case of the present invention, cooling and molding occur at the same time with a resultant lowering of the core temperature of the cheese to approximately 10° C. The cooled cheese is then salted for about thirty minutes, as compared to prior art cooling and salting for one to two hours. In addition, because the cheese is cold, it is not necessary to continually cool the brine as much during this stage of the process. The cheese is then packed and shipped.

In the case of large cheeses, here, in the present invention, molding and cooling occurs inside the machine illustrated in FIG. 1. Because of the added surface area, the brining need only be done for approximately two and one-half hours, as opposed to the twenty-four hour brining previously required. Finally, the cheese must be compressed or vacuumized and packed for curing from two to three days. Similar to the consumer size cheese process, brining for two and a half hours also requires less cooling of the brine since the cheese core is now cooled as compared to the prior art process. In addition, the curing in the package is reduced to only two to three days with the present invention, as opposed to twelve to fourteen days, resulting in very substantial warehousing costs for the cheese, especially when it is realized that the warehousing costs are increased due to the fact that the warehouse must be cooled and small inventories are now possible.

In addition to the above advantages, the invention results in increased speed of the cheese molding machine illustrated in FIG. 1. In particular, the machine may be run at twice the speed of the machine described in my earlier prior art patent.

It is noted that I have described above one embodiment of my invention and that modifications of the invention will be obvious to those of ordinary skill in the art. For example, the fin arrangement illustrated in solid lines in FIG. 2 may be replaced with a sword type arrangement in which a sword-like fin 182 replaces sword 112. In this case, only a single hole 184 is needed to allow the sword to pass through the plunger but two rods 186 are required in order to support the plunger plate 188. Also, the stop assembly 128 is optional and/or replaced by stop bar 190.

In addition, the fins which ar attached to the top plate of the mold may be replaced by fins 190 as illustrated in FIG. 3, which fins 190 are secured to the inside wall of the mold. In this case, the plunger plate 192 must include grooves 194 which allow fins 190 to pass through them. Still other embodiments of the invention using side supported fins such as those illustrated in FIG. 3 may be seen by reference to the various plunger plates schematically illustrated in FIGS. 6 through 12. Alternative assemblies corresponding to the embodiment illustrated in solid lines in FIG. 2 may be seen with reference to the plunger plates illustrated in FIGS. 13 through 23. FIGS. 24 and 25 illustrate similar plunger plates for round cross-section cheese.

While an illustrative embodiment of the invention has been described, other features may be incorporated in the inventive system. For example, after the cheese mold 104 has been emptied of cheese, it may be misted with warm brine or steam to warm it in order to insure a smooth finish on the cheese. Flushing may be achieved without a pump by providing holes in wall 86 at each compartment and providing a stationary second wall radially outward from wall 86 and in sealing engagement therewith at its upper 200 and lower 202 circumferential limits and by having vertically disposal sealing members extending therebetween at 204 and 206, with holes in the second wall at 150 to flush compartments by gravity. Also, in the case of the apparatus of FIG. 4, the five cheese molds 104 may be filled at one time and the table advanced 30° at a time and the ejecting operation performed every 30° movement on five cheeses. Likewise cheeses may be ejected by air pressure instead of a plunger. These and other objects and advantages of the invention are within the spirit and scope of the invention which is limited only by the appended claims.

I claim:

1. Apparatus for molding hot cheese, comprising:
   (a) a plurality of mold means each for defining volume for receiving hot cheese and for defining open area through which cheese may be driven into said volume;
   (b) feeder means having an output communicating with said open area for filling one of said mold means with hot cheese when said open area of said mold means is in communication with said output to form hot molded cheese;
   (c) motion means for sequentially moving each of said open areas of said mold means into communication with said output in sequence;
   (d) area increasing fin means disposed in each of said mold means for creating additional surface area in the hot molded cheese disposed in said mold means;
   (e) cooling means for maintaining a coolant fluid in contact with said mold means; and
   (f) ejector means for ejecting cooled cheese with said additional surface area from said mold means.

2. Apparatus as in claim 1, further comprising metal means for supporting said fin means and said metal means together with said fin means are positioned and dimensioned to act as a heat sink.

3. Apparatus as in claim 1, wherein each of said mold means defines a plurality of compartments, each of said plurality of compartments each defining a separate volume for containing hot molded cheese and a separate open area through which cheese may be driven, said compartments being positioned to be filled simultaneously with hot cheese.

4. Apparatus as in claim 1, wherein said motion means comprises a flat planar member with a plurality of orifices disposed in it, each of said orifices in communication with one of said compartments, the open areas of all compartments in each mold means being positioned and configured to simultaneously overlie said orifices and substantially cover them, and further comprising mounting means for securing said compartments to said planar member.

5. Apparatus as in claim 4, wherein said cooling means comprises a pair of circumferential sidewalls for containing fluid coolant disposed on said flat planar member and wherein said mold means are sequentially moved in communication with said feeder means by a motor means which rotates said flat planar member.

6. Apparatus as in claim 5, further comprising means for severing molded cheese, said severing means disposed on the side of said flat planar member opposite said molds means.

7. Apparatus as in claim 1, wherein, each of said mold means defines a plurality of compartments, each of said plurality of compartments each defining a separate volume for containing hot molded cheese and a separate open area through which cheese may be driven, such compartments being filled simultaneously with hot cheese.

8. Apparatus as in claim 7, wherein, each of said fin means is disposed on the inside of its respective compartments, said compartments comprising sidewalls and said fin means being secured to and extending from a sidewall thereof toward the center of said compartment, said sidewall extending away from said flat planar member.

9. Apparatus as in claim 8, wherein, each of said compartments comprises a single cylindrical mold.

10. Apparatus as in claim 9 wherein said fin means is substantially cylindrical in shape and disposed parallel to its respective cylindrical mold.

11. Apparatus as in claim 7, wherein, each of said fin means is disposed on the inside of its respective compartment, said fin means extending from the side of said compartment opposite said flat planar member and toward said flat planar member.

12. Apparatus as in claim 11, wherein, each of said compartments comprises a single cylindrical mold.

13. Apparatus as in claim 12, wherein, said cylindrical mold is of circular cross-section.

14. Apparatus as in claim 12, wherein, said cylindrical mold is of rectangular cross-section.

15. Apparatus as in claim 7, wherein, each of said compartments is cylindrical in cross-section and each further comprises a plunger body disposed in its respective compartment adapted to mate with the shape defined by the inside cylindrical section of said compartments and said fin means.

16. Apparatus as in claim 15, further comprising a plunger pushing element and limit means disposed over said plunger pushing element for limiting the movement of said plunger pushing element when said plunger body is advanced away from said flat planar member by hot cheese fed by said feeder means to limit the size of said molded hot cheese and said ejector means comprises plate means for pushing on said pushing element to eject cooled molded cheeses.

17. Apparatus as in claim 16, wherein said cooling means further comprises a plurality of radially extending sidewalls extending between said circumferential sidewalls to form a plurality of individual housings, each of said housings containing a mold means, and further comprising flooding means for individually flooding with coolant, each of said individual housings after all the compartments contained in said individual housing have been filled with hot cheese and yet further comprising flushing means for removing coolant after hot cheese in said compartment has been allowed to cool to a desired temperature.

18. Apparatus as in claim 17, wherein, said flushing means, said ejector means, said feeder means, and said severing means, and said flooding means are disposed sequentially in the direction of rotation at relatively close angular intervals with respect to each other and said flooding means and said flushing means are disposed sequentially in the direction of rotation at a relatively large angular interval.

19. Apparatus as in claim 18 wherein said severing means preceeds said flooding means.

20. Apparatus as in claim 1 wherein, said area increasing means is a fin disposed on the inside of its respective compartment, said fin extending from a sidewall thereof toward the center of said compartment, said sidewall extending away from said flat planar member.

21. Apparatus as in claim 1, wherein, a support member is disposed across the side of said compartment opposite said motion means and said area increasing means is a sword-like blade disposed on the inside of its respective compartment, said blade extending toward said flat planar member.

22. Apparatus as in claim 21, wherein, each of said compartments is cylindrical in shape and further comprising a plunger body adapted to conform to said compartments and said area increasing means.

23. Apparatus for molding hot cheese, comprising:
(a) a plurality of mold means each for defining volume for receiving hot cheese and for defining open area through which cheese may be driven into said volume;
(b) feeder means having an output communicating with said open area for filing one of said mold means with hot cheese when said open area of said mold means is in communication with said output to form hot molded cheese;
(c) motion means for sequentially moving said mold means into communication with said output sequence;
(d) cooling means for individually maintaining coolant in contact with each of said mold means;
(e) area increasing means disposed in each of said mold means for creating additional surface area in the molded cheese disposed in said mold means;
(f) stop means for stopping coolant from contacting said mold means; and
(g) ejector means for ejecting cooled cheese from said mold means.

24. Apparatus as in claim 23, wherein each of said mold means defines a plurality of compartments, each of said plurality of compartments being positioned, configured and dimensioned to be filled simultaneously with hot cheese.

25. Apparatus as in claim 23, wherein said motion means comprises a flat planar member with a plurality of orifices disposed in it, each of said orifices in communication with one of said compartments, and said cooling means comprises a circumferential sidewall for containing fluid coolant disposed on said flat planar member and wherein said mold means are sequentially moved in communication with said feeder means by a motor means which rotates said flat planar member, said cooling means further comprising a plurality of radially extending sidewalls disposed against said circumferential sidewall to form a plurality of individual housings, each of said housings containing a mold means.

26. Apparatus as in claim 25, wherein said cooling means comprises flooding means for introducing a coolant into each of said housings after the compartments contained within said housing have been filled with cheese and said stop means comprises flushing means for removing coolant from each of said housings after the cheese has cooled to a desired temperature.

27. Apparatus as in claim 26, further comprising means for severing molded cheese, said severing means disposed on the side of said flat planar member opposite said mold means and comprising a flat planar member defining open area configured and dimensioned to be in facing relationship to said output of said feeder means.

28. Apparatus as in claim 27, wherein each of said mold means defines a plurality of compartments, each of said plurality of compartments being configured, dimensioned and positioned to be filled simultaneously with hot cheese.

29. Apparatus as in claim 28, wherein each of said compartments comprises a single cylindrical mold.

30. Apparatus as in claim 29, wherein said cylindrical mold is of circular cross-section.

31. Apparatus as in claim 30, wherein said cylindrical mold is of rectangular cross-section.

32. Apparatus as in claim 31, wherein each of said compartments is cylindrical in cross-section and further comprising a plunger body disposed in each of said compartments and adapted to conform to said compartments.

33. Apparatus as in claim 32, further comprising a plunger pushing element and limit means disposed over said plunger pushing element for limiting the movement of said plunger pushing element when said plunger body is advanced away from said flat planar member by hot cheese fed by said feeder means to limit the size of said molded hot cheese and said ejector means comprises plate means for pushing on said pushing element to eject cooled molded cheeses.

34. Apparatus as in claim 33, wherein, said flushing means, said ejector means, said feeder means, said severing means, and said flooding means are disposed sequentially in the direction of rotation at relatively close angular intervals with respect to each other and said flooding means and said flushing means are disposed sequentially in the direction of rotation at a relatively large angular interval.

* * * * *